United States Patent
Ninomiya et al.

(10) Patent No.: US 6,879,974 B1
(45) Date of Patent: Apr. 12, 2005

(54) NUMERICAL STOCHASTIC INTEGRATION SYSTEM

(75) Inventors: Syoiti Ninomiya, Tokyo (JP); Masayuki Katai, Kohnosu (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/281,745

(22) Filed: Mar. 30, 1999

(30) Foreign Application Priority Data

Mar. 30, 1998 (JP) .......................... 10-084613

(51) Int. Cl.⁷ ............................... G06N 5/02
(52) U.S. Cl. .................... 706/62; 707/3; 707/4
(58) Field of Search ................ 706/20, 25, 45, 706/59; 707/3, 4; 704/254; 600/300; 382/159

(56) References Cited

U.S. PATENT DOCUMENTS

| | | | | |
|---|---|---|---|---|
| 5,465,321 A | * | 11/1995 | Smyth | 706/20 |
| 5,524,240 A | * | 6/1996 | Barbara et al. | 707/3 |
| 5,553,284 A | * | 9/1996 | Barbara et al. | 707/4 |
| 5,602,964 A | * | 2/1997 | Barrett | 706/25 |
| 5,649,023 A | * | 7/1997 | Barbara et al. | 382/159 |
| 5,802,256 A | * | 9/1998 | Heckerman et al. | 706/26 |
| 5,855,011 A | * | 12/1998 | Tatsuoka | 706/45 |
| 6,006,186 A | * | 12/1999 | Chen et al. | 704/254 |
| 6,056,690 A | * | 5/2000 | Roberts | 600/300 |

OTHER PUBLICATIONS

Papadopoulos, A.S.; Tiwari, R.C.; Zalkikar, J.N., Hierarchical Bayes estimation for the exponential–multinomial model in reliability and competing risks, Reliability, IEEE Transactions on, vol.: 45 3, Sep. 1996, pp. 477–484.*
Tung, S.S.; Lu, M.–F., Reliability of a tree network using multinomial distribution, Uncertainty Modeling and Analysis, 1993. Proceedings., Second International Symposium on Apr. 25–28, 1993, pp. 548–551.*
Sivaram, R.; Panda, D.K.; Stunkel, C.B., Efficient broadcast and multicast on multistage interconnection networks using multiport encoding, Parallel and Distributed Processing, Oct. 23–26, 1996 IEEE Symposium on, 1996, pp. 36–45.*
Sivaram, R.; Panda, D.K.; Stunkel, C.B., Efficient broadcast and multicast on multistage interconnection networks using multiport encoding, Parallel and Distributed Systems, IEEE Transactions on vol.: 9 10, Oct. 1998, pp. 1004–1028.*
Lehmann, B., A multinomial characterization of feedforward neural networks, Computational Intelligence for Financial Engineering, 1995., Proceedings of the IEEE/IAFE 1995, Apr. 9–11, 1995, pp. 79–86.*

* cited by examiner

*Primary Examiner*—Wilbert L. Starks, Jr.
(74) *Attorney, Agent, or Firm*—Whitham, Curtis & Christofferson, PC; Stephen C. Kaufman

(57) ABSTRACT

A method and system are provided for constructing a discrete model using a multinomial tree structure with which a required memory capacity can be reduced and a realistic calculation time can be achieved, while ensuring a required calculation accuracy. For calculation of stochast

5 Claims, 7 Drawing Sheets

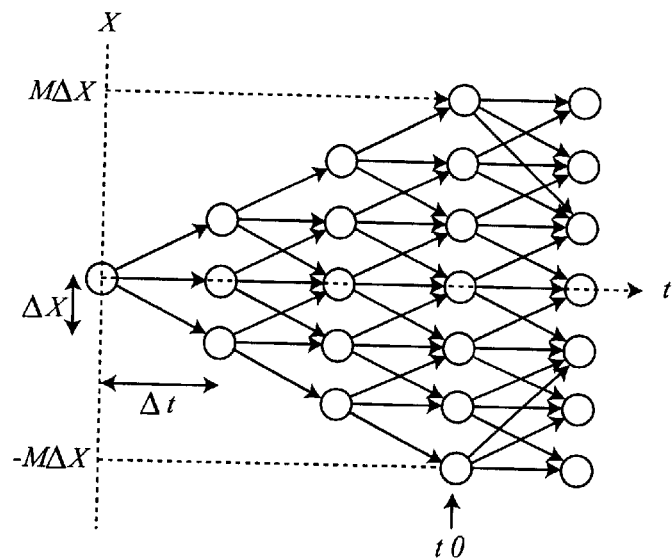
Figure 1
(PRIOR ART)
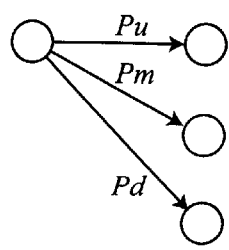 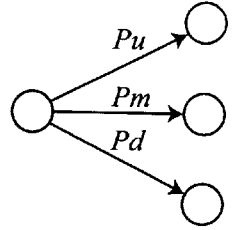 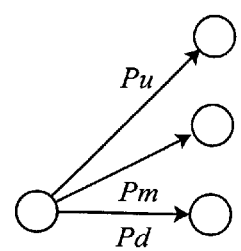
Figure 2A
(PRIOR ART)
Figure 2B
(PRIOR ART)
Figure 2C
(PRIOR ART)

NUMERICAL STOCHASTIC INTEGRATION SYSTEM

BACKGROUND OF THE INVENTION

1. Field of the Invention

The present invention relates to a numerical stochastic integration method and system, and in particular to a technique by which stochastic integration of a Markov stochastic process can be calculated at high speed and with a small memory.

2. Related Art

Conventionally, "Single-factor Interest Rate Models And The Valuation Of Interest Rate Derivative Securities," Hull J. and A. White, Journal of Financial and Quantitative Analysis, 28, 1993, pp. 235 to 254, is well known as a method whereby discrete approximation models for the Hull-White model and the BK model can be described by using a recombining trinomial tree structure by a computer. This method is further improved as is described in "Numerical Procedures For Implementing Term Structure Models I: Single-Factor Models," Journal of Derivatives, 2, 1, Fall 1994, pp. 7 to 16. An example using this model is the "Hull-White Model Using EXCEL," Nippon Credit Bank, Development Department, Financial Affairs Research Associates, 1996. The outline for a trinomial tree construction method will now be explained.

A discrete approximation model for the Hull-White model or the BK model is provided by acquiring a discrete approximation model used for a real valued diffusion process $X_t$, which is described by the following stochastic differential equation:

$$dX_t = -aX_t dt + \sigma dB_t. \quad \text{[Equation 1]}$$

In this equation, t denotes time, $B_t$ denotes the standard Brownian motion, and a denotes a positive constant. The constant a is called a central regression constant, and the term $-aX_t dt$ is called a central regression term. Since a Markov stochastic process is the stochastic process that is employed, discrete approximation can be performed by using a recombining trinomial tree structure shown in FIG. 1. In this case, the discrete width in the spatial direction is denoted by $\Delta X$, and the discrete width along the time line is denoted by $\Delta t$. $\Delta X = \sigma\sqrt{(3\Delta t)}$ is established by analysis relative to a discretizing error that occurs from a Euler approximation. Each node in FIG. 1 corresponds to a state, and each arrow corresponds to an arrival probability (movement probability) at which the node is moved from a specific state to another state. It should be noted that in this process, unlike the normal Brownian motion, the spread of the discrete model in the spatial direction is halted en route because of the presence of the central regression term. The limiting point is represented by to in FIG. 1. In FIG. 1, the limits for this process are denoted by $M\Delta X$ and $-M\Delta X$. In the Hull-White discrete model, the process can be successfully simplified so that tree structure branches at the above point can be described by using three patterns (a), (b) and (c) in FIG. 2.

Specifically, integer M in FIG. 1 is calculated in advance using [Equation 2]

$$\frac{0.184}{a\Delta t} < M < \frac{0.186}{a\Delta t}$$

When the position of the node in the spatial direction reaches the upper limit, pattern (a) in FIG. 2 is employed; when the position of the node reaches the lower limit, pattern (c) is employed; and for the other cases, pattern (b) is employed. The arrival probability for each case can be easily calculated. Since when $\Delta \to 0$ the thus obtained discrete model converges in the stochastic process $X_t$, which is determined by the stochastic differential equation, the mathematically correct discrete process can be obtained.

It is known that a discrete process error due to the Euler approximation in the stochastic process is proportional to $\Delta t$. When a discrete interest rate model, such as the Hull-White model, is used for the calculation of the prices of derivatives, a very accurate discrete result of approximately $\Delta t < \frac{1}{200}$ is required in order to obtain a discrete process error that is not greater than 1 (bp), which is the practical ideal accuracy (see "Toward Real-time Pricing Of Complex Financial Derivatives," Ninomiya, S., and S. Tezuka, Applied Mathematical Finance, 3, 1996, pp. 1 to 20). When the above trinomial tree structure for a ten-year interest period model is constructed that provide this accuracy, 500 MB or more of main memory is required, and the time required for the calculation of the price is unrealistic. Actually, since a 20 to 30 year time length is required for the interest period model in order to employ it to calculate the risk management probabilities for an asset, it is impossible for the conventional technique to perform the calculations with the required accuracy when a trinomial tree structure is used.

SUMMARY OF THE INVENTION

It is, therefore, one object of the present invention to provide a method and a system for constructing a discrete model, using a multinomial tree structure, for which the required memory capacity is reduced and with which a realistic calculation time is possible, while at the same time maintaining a required accuracy for calculations.

It is another object of the present invention to provide a method and a system for performing stochastic integration in a Markov stochastic process while maintaining a required accuracy for calculations, and for reducing a required memory capacity in order to achieve a realistic calculation time.

It is an additional object of the present invention to provide a method and a system for performing fast stochastic integration in a stochastic process using a recombining multinomial tree structure.

It is still another object of the present invention to provide a method and system for performing accurate stochastic integration in a stochastic process using a recombining multinomial tree structure.

It is a still additional object of the present invention to provide a method and system for which only a small memory capacity is required to perform stochastic integration of a stochastic process using a recombining multinomial tree structure.

It is a still further object of the present invention to provide a method and a system for performing for derivatives high speed and accurate price calculations for which only a small memory capacity is required.

It is yet another object of the present invention to provide a method and a system for performing for financial assets high speed and accurate prevailing price aggregation calculations for which only a small memory capacity is required.

It is yet an additional object of the present invention to provide a method and a system for a risk management for performing an interest rate model high speed and accurate stochastic calculations for which only a small memory capacity is required.

To achieve the above objects, for the calculation of stochastic integration of a stochastic process using a recombining multinomial tree structure, first, a constant C is stored in the memory of the system. Then, before a specific node is created, the arrival probability of the node is calculated, and when the node is an end node and its arrival probability is smaller than the constant C, the creation of the node is inhibited.

FIG. 5 is a flowchart of a numerical stochastic integration system according to the present invention. A block 510 is a constant storage block at which the constant C is stored in the memory of the system. A block 520 is an arrival probability calculation block at which the arrival probability of a specific node is calculated by the system before that node is created. A block 530 is a node control block at which control of the number of branch nodes is exercised. At block 530, when the inhibited end node is an upper end node, the arrival probability of the inhibited end node is added to the arrival probability of a node immediately below the end node. And when the inhibited end node is a lower end node, the arrival probability of the inhibited end node is added to the arrival probability of a node immediately above the end node. The end node means the upper end node or the lower end node. The upper end node is a node V located at the topmost position in the node tree shown in FIG. 3, and the lower end node is a node D located at the lowermost position in the node tree. With this structure, fast stochastic integration can be performed for which a smaller memory is required, while a necessary accuracy for the calculations is maintained. The trinomial tree structure that constitutes the most typical multinomial tree pattern is employed in the following embodiment; however, the method of the present invention is not limited to this tree structure, and can be applied for other multinomial tree structures.

BRIEF DESCRIPTION OF THE DRAWINGS

FIG. 1 is a diagram illustrating how a discrete model is spread in the spatial direction.

FIG. 2 is a diagram showing the branching of a trinomial tree structure in a Hull-White discrete model.

DESCRIPTION OF THE PREFERRED EMBODIMENT

Figure 10:
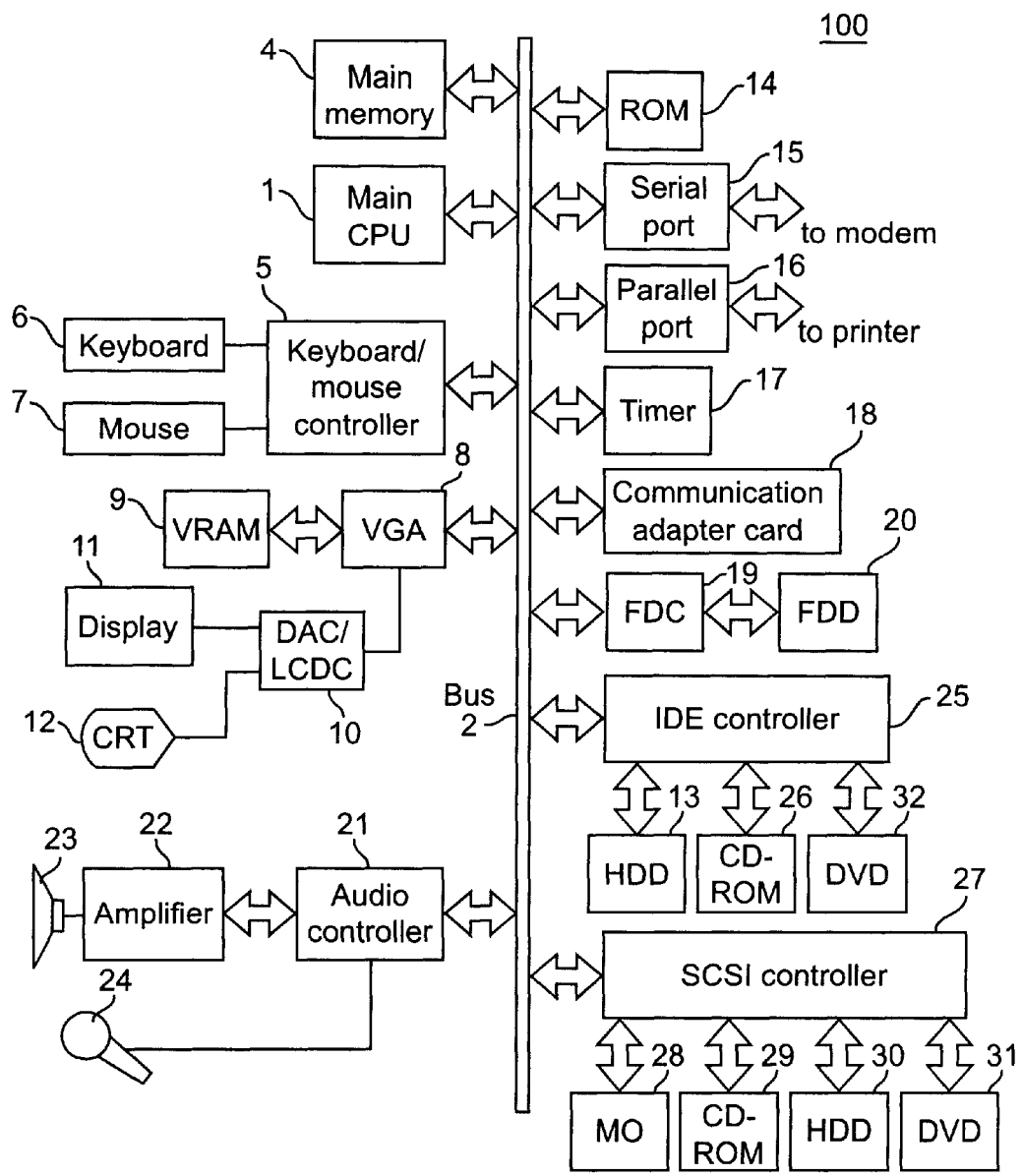
FIG. 10 is a diagram illustrating an example hardware arrangement for an integration system to be used for the present invention.

The preferred embodiment of the present invention will now be described while referring to the accompanying drawings. In FIG. 10 is shown an example hardware arrangement for an integration system 100 according to the present invention. The integration system 100 includes a central processing unit (CPU) 1 and a memory 4. The CPU 1 and the memory 4 are connected via a bus 2 and an IDE controller 25 to a hard disk drive 13 (or to a storage medium driver such as an MO, a CD-ROM or a DVD), which is an auxiliary storage device. Similarly, the CPU 1 and the memory 4 are connected via the bus 2 and a SCSI controller 27 to a hard disk drive 30 (or to a storage medium driver such as an MO 28, a CD-ROM 29 or a DVD 31), which is an auxiliary storage device. A floppy disk drive 20 is also connected to the bus 2 via a floppy disk controller 19. Preferably, the constant C and integration software are stored in an auxiliary memory and are loaded into the memory 4.

A floppy disk is inserted into the floppy disk drive 20, and a computer program code or data, which interacts with an operating system and issues commands to the CPU 1, etc., for implementing the present invention is stored either on the floppy disk or on the hard disk drive 13 (or a storage medium, such as an MO, a CD-ROM or a DVD), and in a ROM 14, and is loaded into the memory 4 for execution. The computer program code may be compressed, or may be divided into a plurality of segments and stored on a plurality of media.

The system 100 further includes user interface hardware components, such as a pointing device 7 (a mouse or a joystick) or a keyboard 6 for data entry, and a display 12 for providing visual data for a user. A printer and a modem can be connected to the system 100 via a parallel port 16 and a serial port 15, respectively. The system 100 can also be connected to a network via the serial port 15, the modem or a communication adaptor 18 (an ethernet or a token ring card) for communication with other computers. A remote controlled transceiver may be connected to the serial port 15 or to the parallel port 16 for the exchange of data using infrared rays or electric waves.

Via an amplifier 22, a loudspeaker 23 receives an analog audio signal, which is obtained by D/A (digital/analog) conversion performed by an audio controller 21, and outputs it as sound. The audio controller 21 receives audio data from a microphone 24 and performs an A/D (analog/digital) conversion of it, and fetches external audio data.

It can be easily understood that the integration system 100 of the present invention may be provided as an ordinary personal computer (PC), a workstation, a notebook PC, a palmtop PC, a network computer, a home electric appliance, such as a television incorporating a computer, a game machine having a communication function, a telephone, a facsimile machine, a portable telephone, a PHS, a communication terminal, including a personal digital assistant, having a communication function, or a combination of such devices. In addition, the previously described components are merely examples; not all the listed components are required for the integration system 100.

An explanation will be given outlining the calculation performed to obtain the price of a derivative by using a trinomial tree structure, which seems to be the most typical multinomial tree structure. Since the calculation to obtain the price/value of a derivative constitutes stochastic integration in a stochastic process, a node that originates at a node t=0 and has a small arrival probability has little affect on the calculation. In the Hull-White method the upper limit and the lower limit in the spatial direction are determined by using equations; however, even when the branching condition is determined using the method of the present invention, by using the resultant trinomial tree structure the adverse affect on the calculation of the price of a derivative is less. The following steps represent the method for determining a condition for branching from a specific node.

Step 0

A specific reference value C that is a constant, 0<C<1, is determined.

Step 1

An arrival probability (movement probability) P for the node from node t=0 is calculated.

Figure 3:
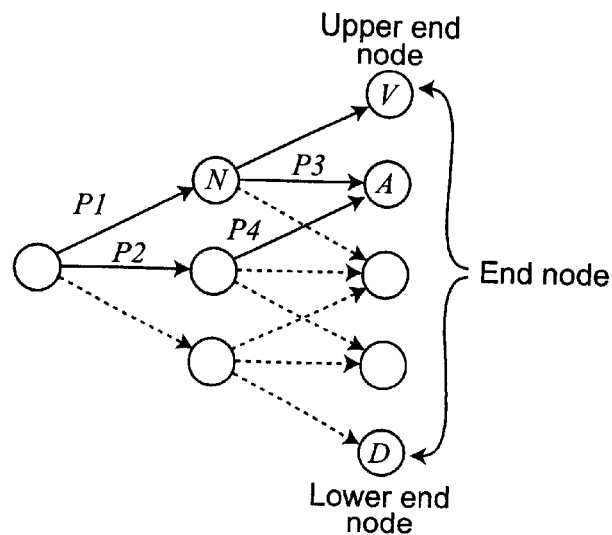
FIG. 3 is a diagram for explaining an arrival probability, an upper end, a lower end, and an end node.

In FIG. 3, for example, the arrival probability acquired for the node A is $P=P_1P_3P_2P_4$.

Step 2

When P>C, the conventional method is employed to acquire the branching method and the arrival probability.

Figure 4:
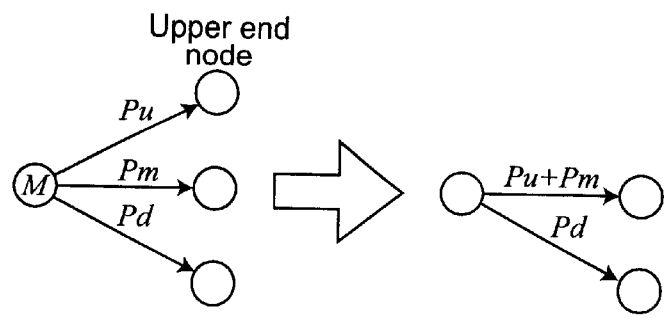
FIG. 4 is a diagram illustrating the method for branching from nodes and the method for calculating an arrival probability.
Figure 5:
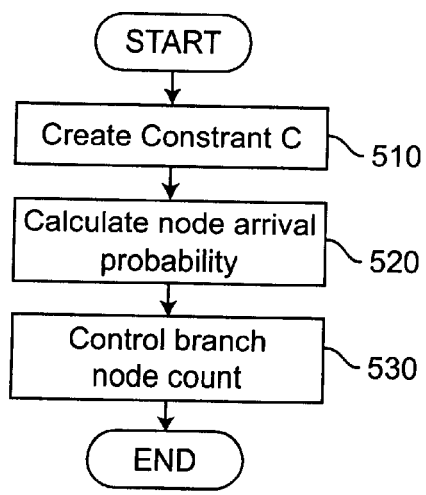
FIG. 5 is a block diagram illustrating a stochastic integration system according to the present invention.
Figure 6:
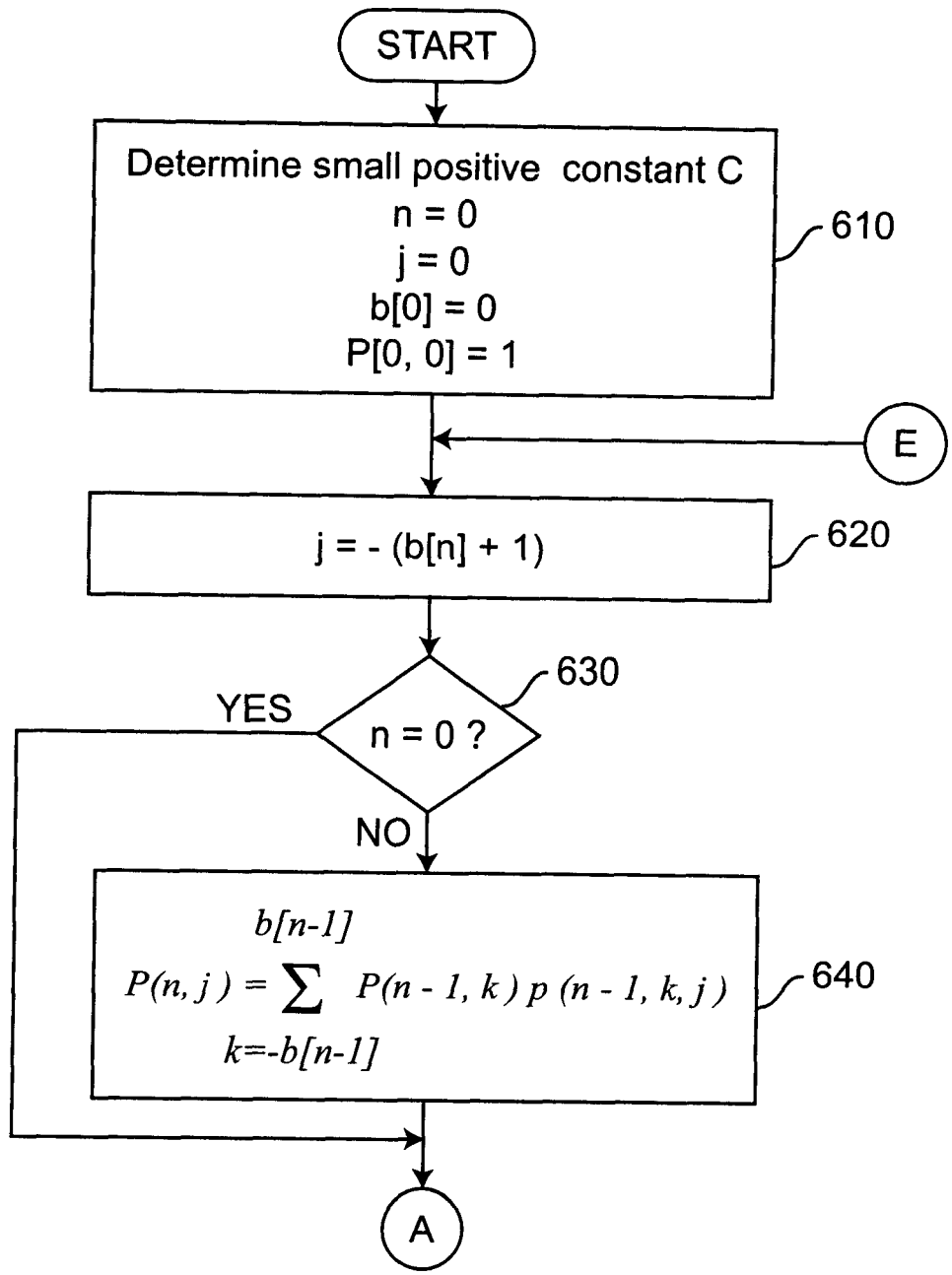
FIG. 6 is a flowchart showing multinomial tree creation processing using the method of the present invention.
Figure 7:
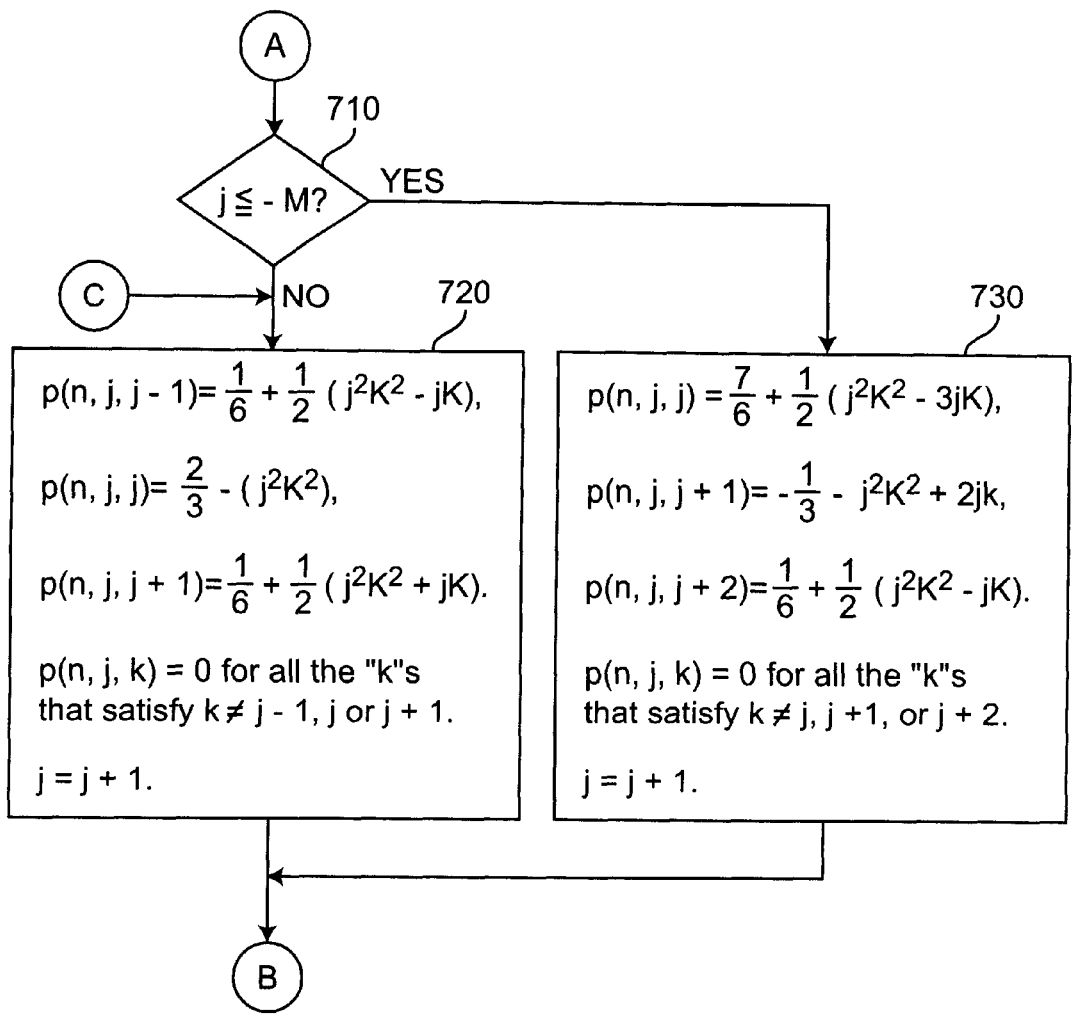
FIG. 7 is a flowchart showing the multinomial tree creation processing using the method of the present invention.
Figure 8:
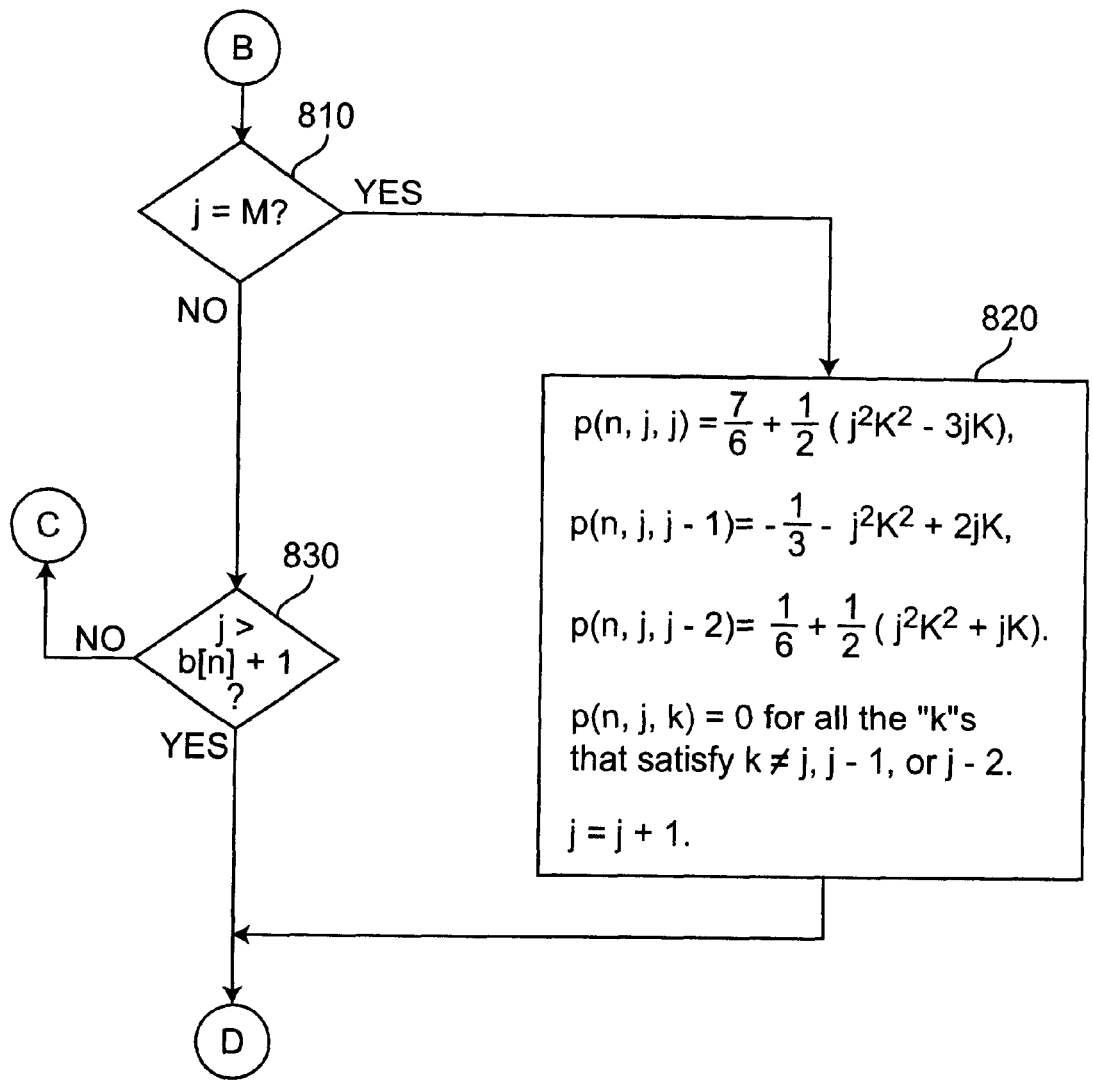
FIG. 8 is a flowchart showing the multinomial tree creation processing using the method of the present invention.
Figure 9:
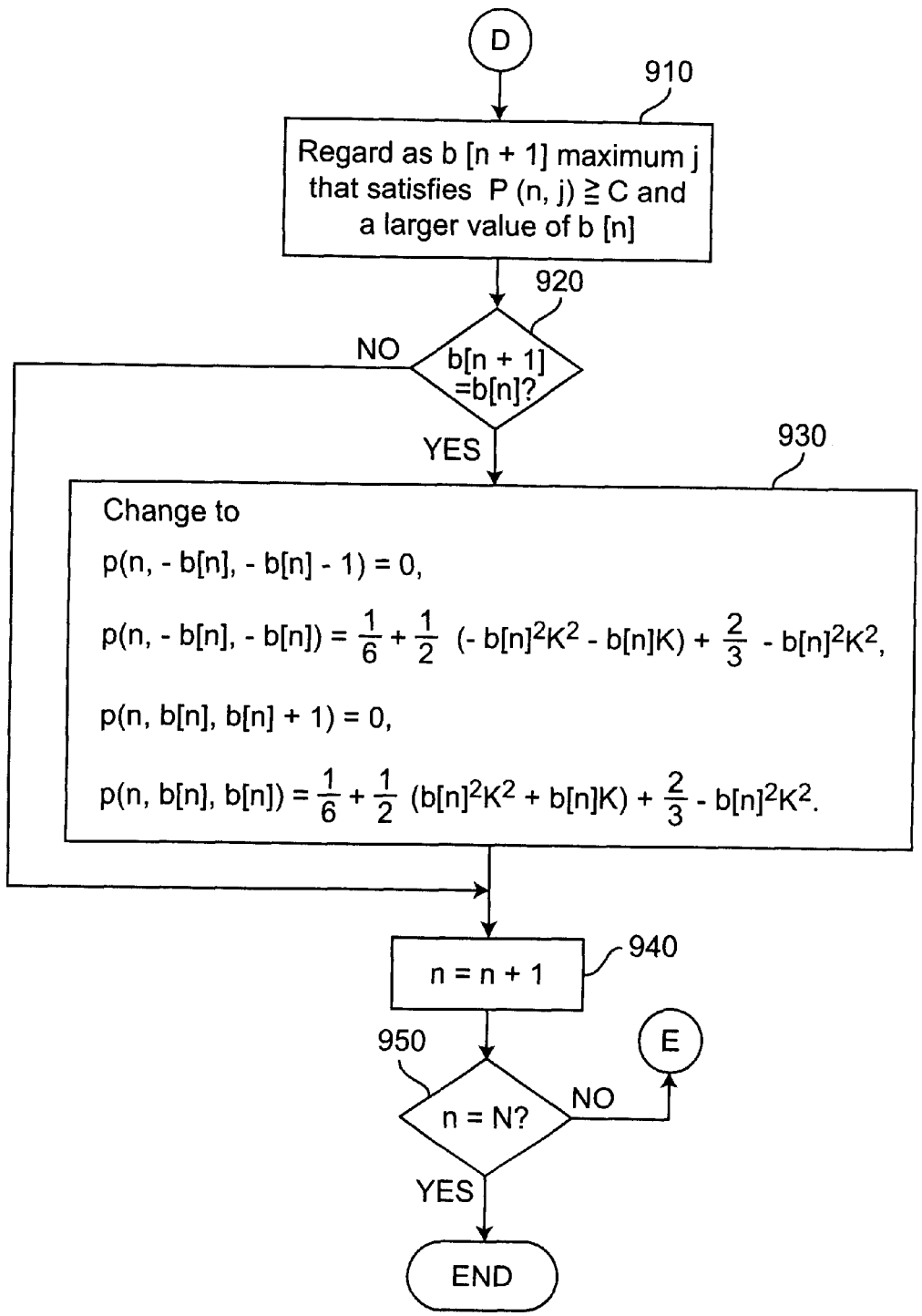
FIG. 9 is a flowchart showing the multinomial tree creation processing using the method of the present invention.

When P<C and the node is an end node, the creation of the node is inhibited. Then, as is shown in FIG. 4, the creation of the upper end node is inhibited, and the number of branches originating at the node M is two. The arrival probability is calculated as follows. When the arrival probability in the upper direction calculated from the node M by the conventional method is defined as $P_u$, the arrival probability in the horizontal direction is defined as $P_m$, and the arrival probability in the lower direction is defined as $P_d$, it is assumed that the arrival probability calculated from the node M in the horizontal direction is $P_u+P_m$ and the arrival probability in the lower direction is $P_d$. Similarly, when a specific node is a lower end node, it is assumed that the arrival probability calculated from the node M in the horizontal direction is $P_d+P_m$ and the arrival probability in the upper direction is $P_u$. That is, when the creation of the upper end node is inhibited, the arrival probability for the upper end node is added to the arrival probability for the node immediately below the upper end node. When the creation of the lower end node is inhibited, the arrival probability for the lower end node is added to the arrival probability for the node immediately above the lower end node.

A discrete model provided by the present method does not converge in the original stochastic process (Equation 1) at the limit Δ−>0. Thus, this model does not provide a mathematically correct discrete process, but as regards the original purpose of the calculation of the price/value of a derivative, an error occurs so small that it can hardly be detected. Therefore, the practical use of this model presents no problem. The same structure can be employed to provide a risk management system for use by financial organizations, such as banks.

An explanation will now be given for a more detailed example calculation of the price of a derivative using the trinomial tree structure of the present invention. An interest rate model, such as a Hull-White model or a Black-Karasinski model, is represented that uses a real valued diffusion process $Y_t$ represented by the following stochastic differential equation:

$$dY_t=(\theta(t)-aY_t)dt+\sigma dB_t.$$ [Equation 3]

The trinomial tree structure representing the discrete approximation model can be created by the following two steps.

Step 1

A trinomial tree structure that is a discrete approximation model in a stochastic process $dX_t=-aX_tdt+\sigma dB_t$ is created when a θ=0.

Step 2

Nodes aligned along the identical time line in the trinomial tree structure that is created at step 1 are employed as a group (called a slice), and individual slices are moved horizontally in the spacial direction to obtain a trinomial tree structure to perform a discrete approximation for the process Yt.

The present invention is related to the process at step 1 and the trinomial tree structure that is created. Since the process at step 2 is described in various documents, no explanation for it will be given. FIGS. 6 to 9 are flowcharts for performing the process at step 1 using the method of the present invention. As an assumption, a trinomial tree structure is employed that expresses the interest rate for a period [0, NΔt] using a discrete width Δt. Further, the discrete width in the spatial direction is ΔX, and a node representing time coordinate nΔt and spatial coordinate mΔX is Q(n, m). The arrival probability for the passage from Q(0, 0) to Q(n, m) is P(n, m), and the arrival probability for the passage from Q(n, m) to Q(n+1, 1) is P(n, m, 1). M is an integer that satisfies 0.184/(aΔt)<M <0.816/(aΔt), and K=−aΔt or K=e$^{−aΔt}$−1.

Step 610 is the initial step. First, a positive small constant C is selected. When n denotes a slice number, j denotes a node number in a slice, b[n] denotes the width of the n-th slice, and P(i, j) denotes an arrival probability for the passage from Q(0, 0) to Q(i, j), initialization is performed to acquire n=0, j=0, b[0]=0 and P(0, 0)=1. At step 620 the initial width of the slice is set. At step 630 whether or not an exception process is to be performed for the first slice is determined. Specifically, a check is performed to determine whether n is 0, and when the result is YES, program control moves to step 710, while when the result is NO, the arrival probability P(n, j) for the passage from node Q(0, 0) to node Q(n, j) is calculated. Program control thereafter moves to step 710.

At step 710, a check is performed to determine whether the node is a lower end node. When the result is YES, program control moves to step 730, and when the result is NO, program control advances to step 720. At step 720, the arrival probability is calculated for a movement from the node that is not an end node to a node in the next slice. At step 730, the arrival probability is calculated for a movement from the node that is an end node to a node in the next slice.

Following this, at step 810, a check is performed to determine whether the node is an upper end node (j=M?). When the result is YES, program control advances to step 820. When the result is NO, at step 830 another check is performed to determine whether the node is an upper end node (j>b[n]+1). When the result at step 830 is YES, program control moves to step 910, while when the result is NO, program control returns to step 720.

At step 910, a node whose arrival probability is smaller than C is deleted. The process at this step is the feature of the present invention. Specifically, the maximum j that satisfies P(n, j)>C, and a larger b[n] are regarded as being b[n+1]. Then, program control moves to step 920, whereat a check is performed to determine whether the shape of the multinomial tree structure has been changed. When the result is YES, at step 930, after the node having a small arrival probability has been deleted, the post process (correction of the arrival probability) is performed, and program control thereafter advances to step 940. When the result at step 920 is NO, program control skips step 930 and moves to step 940. Finally, at step 950 a check is performed to determine whether the process has been completed (n=N?). When the result is YES, the process is thereafter terminated, while when the result is NO, program control returns to step 620.

An explanation will now be given for example results obtained by the actual employment of the present invention. A discrete model prepared using the method of the present invention with C=10$^{−12}$ is compared with a discrete model prepared using the conventional method. When Δt=0.003 (Year) is employed to prepare a model for a five-year period interest structure, the memory required for the model prepared using the method of this invention is ⅕ the memory required for the model prepared using the conventional method. The calculation for the model prepared using the method of the invention is performed ten times faster than the calculation for the model prepared using the conventional method. The difference between the calculation results obtained using the two models is very small, i.e., equal to or less than $10^{-4}$(bp), and this value does not present any practical problems.

Advantages of the Invention

In order to calculate the prices of derivatives, to estimate the prevailing prices of financial assets, and to manage risks, stochastic integration is required in a stochastic process that is described by a stochastic differential equation called an interest rate model. According to the present invention, the interest rate model is expressed using a multinomial tree structure that is recombined, and a variety of calculations can be performed very efficiently. In addition, according to the present invention, a required calculation accuracy is ensured while using the multinomial tree structure for the Hull-White model or the BK model, the memory requirement can be drastically reduced, and the calculation speed can be increased.

What is claimed is:

1. A numerical stochastic integration system implemented on a computer for calculating stochastic integration of a stochastic process, said computer comprising:

means for using an arrival probability of a node to build a multinomial tree structure representing the stochastic process, the multinominal tree structure being stored in a memory of the computer as a recombining tree describing a discrete model of the stochastic process, wherein said means for using an arrival probability of a node includes:

means for storing a constant C (0<C<1) in said memory;

an arrival probability calculator for calculating an arrival probability of a node before creating said node; and means for inhibiting creation of said node when said node is an end node and said arrival probability is smaller than said constant C, wherein said means for inhibiting creation of said end node includes:

means for, when said inhibited end node is an upper end node, adding said arrival probability of said end node to an arrival probability of a node immediately under said end node; and means for, when said inhibited end node is a lower end node, adding said arrival probability of said end node to an arrival probability of a node immediately above said end node.

2. A derivatives price calculation system, which calculates the price of derivatives by using an arrival probability of a node building multinomial tree structures, which are stored in a memory, as a recombining tree describing an interest rate model, comprising:

means for storing a constant C (0<C<1) in said memory;

an arrival probability calculator for calculating an arrival probability of a node before creating said node; and means for inhibiting creation of said node when said node is an end node and said arrival probability is smaller than said constant C, wherein said means for inhibiting the creation of said end node includes:

means for, when said inhibited end node is an upper end node, adding said arrival probability of said end node to an arrival probability of a node immediately under said end node; and means for, when said inhibited end node is a lower end node, adding said arrival probability of said end node to an arrival probability of a node immediately above said end node.

3. A risk management calculation system implemented on a computer for calculating risk probabilities for risk management, said computer comprising:

means for using an arrival probability of a node to build a multinomial tree structure representing risk probability, the multinomial tree structure being stored in a memory of the computer as a recombining tree representing a risk probability model, wherein said means for using an arrival probability of a node includes:

means for storing a constant C (0<C<1) in said memory;

an arrival probability calculator for calculating an arrival probability of a node before creating said node; and means for inhibiting creation of said node when said node is an end node and said arrival probability is smaller than said constant C, wherein said means for inhibiting creation of said end node includes:

means for, when said inhibited end node is an upper end node, adding said arrival probability of said end node to an arrival probability of a node immediately under said end node; and means for, when said inhibited end node is a lower end node, adding said arrival probability of said end node to an arrival probability of a node immediately above said end node.

4. A numerical stochastic integration method for calculating stochastic integration in a stochastic process on a computer, comprising the steps of:

using an arrival probability of a node to build a multinomial tree structure representing the stochastic process, the multinominal tree structure being stored in a memory of the computer as a recombining tree representing a discrete model of the stochastic process, wherein the step of using an arrival probability of a node includes the steps of:

storing a constant C (0<C<1) in said memory;

calculating an arrival probability of a node before creating said node; and inhibiting creation of said node when said node is an end node and said arrival probability is smaller than said constant C, wherein the step of inhibiting creation of said end node includes:

when said inhibited end node is an upper end node, adding said arrival probability of said end node to an arrival probability of a node immediately under said end node; and when said inhibited end node is a lower end node, adding said arrival probability of said end node to an arrival probability of a node immediately above said end node.

5. A recording medium for a program that calculates stochastic integration for a discrete model of a stochastic process, said program comprising:

a function for using an arrival probability of a node to build a recombining multinomial tree structure describing a discrete model of the stochastic process, wherein said function for using an arrival probability of a node includes:

a function for storing a constant C in said system;

an arrival probability calculation function for calculating an arrival probability of a node before creating said node; and a function for inhibiting creation of said node when said node is an end node and said arrival probability is smaller than said constant C, wherein said function for inhibiting creation of said end node includes:
  a function for, when said inhibited end node is an upper end node, adding said arrival probability of said end node to an arrival probability of a node immediately under said end node; and
  a function for, when said inhibited end node is a lower end node, adding said arrival probability of said end node to an arrival probability of a node immediately above said end node.

* * * * *